United States Patent
Shiomoto

(10) Patent No.: US 6,289,485 B1
(45) Date of Patent: Sep. 11, 2001

(54) METHOD FOR ADDING AND ENCODING ERROR CORRECTING CODES AND ITS DEVICE AND METHOD FOR TRANSMITTING DATA HAVING ERROR CORRECTING CODES ADDED

(75) Inventor: Shoji Shiomoto, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/177,692

(22) Filed: Oct. 22, 1998

(30) Foreign Application Priority Data

Oct. 24, 1997 (JP) .................................... 9-292986

(51) Int. Cl.$^7$ ................................. H03M 13/00
(52) U.S. Cl. ............................................. 714/779
(58) Field of Search ................... 714/752, 779, 714/746; 375/240.03, 243, 240.16; 382/232, 240

(56) References Cited

U.S. PATENT DOCUMENTS 5,748,787 * 5/1998 Sugiyama .............................. 382/240
5,781,561 * 7/1998 Machida et al. ...................... 714/752
5,881,070 * 3/1999 Hoshi .................................... 714/752

OTHER PUBLICATIONS

Wehnes et al., Fast Lossless Image Compression, IEEE, pp. 145–148, Aug. 1996.*

Whoi–Yul et al. Hierarchy Embedded Differential Image for Progressive Transmission Using Lossless Compression, IEEE, p. 1 to 13, Feb. 1995.*

Luttrell, S. P., Hierarchical Vector Quantisation, IEEE, pp. 405–413, Dec. 1989.*

Cuenca et al., An error concealment scheme for MPEG–2 video transmission over ATM–based networks, IEEE 1997.*

Cuenca et al., dynamic error concealment technique for the transmission of hierarchical encoded MPEG–2 video over ATM networks, IEEE, 1997.*

Cuenca et al., Packing scheme for layered coding MPEG–2 Video transmission over ATM based networks, IEEE, 1997.*

Pancha et al., Mpeg coding for variable bit rate Video transmission, IEEE 1994.*

* cited by examiner

*Primary Examiner*—Albert Decady
*Assistant Examiner*—Shelly A. Chase
(74) *Attorney, Agent, or Firm*—Lerner, David, Littenberg, Krumholz & Mentlik, LLP

(57) ABSTRACT

A method for encoding error correcting codes to generate plural coded data having different error correction ability according to significance. An error correcting code having different code length is added to a fixed length of input data according to the significance of the input data (S14). The error correcting codes added which have different error correction ability corresponding to its code length are encoded to generate coded data having different packet length according to the code length of the error correcting code. Thus, plural coded data (S15A and S15B) which have different error correction ability according to significance can be generated. Thereby, even if a quality of transmission system deteriorates when the above coded data is transmitted, the coded data having high error correction ability can be surely decoded.

26 Claims, 9 Drawing Sheets

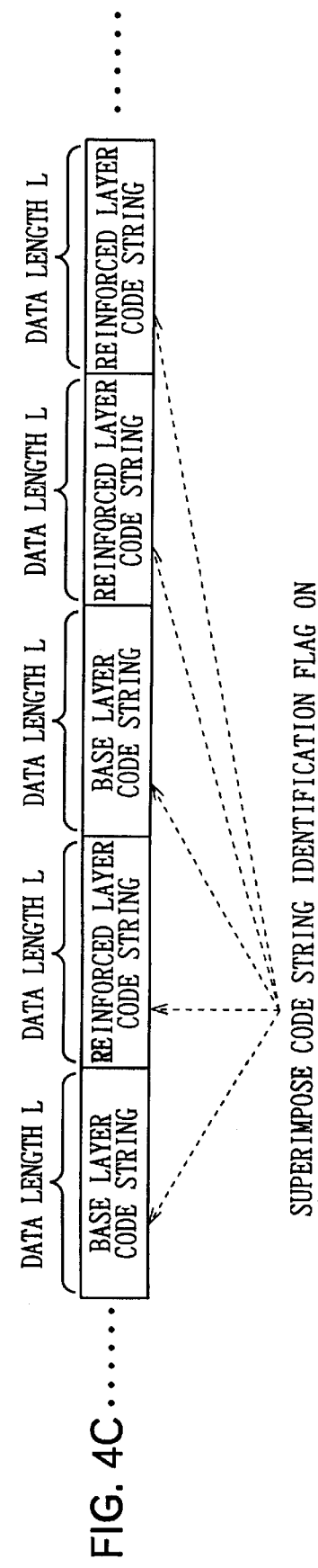

METHOD FOR ADDING AND ENCODING ERROR CORRECTING CODES AND ITS DEVICE AND METHOD FOR TRANSMITTING DATA HAVING ERROR CORRECTING CODES ADDED

FIELD OF THE INVENTION

The present invention relates to a method for encoding error correcting codes and its device and method for transmitting data having error correcting codes added, and is applicable to a digital satellite broadcasting system, for example.

DESCRIPTION OF THE RELATED ART

Heretofore, this type of digital satellite broadcasting system compressively encodes image data of plural programs using an MPEG (Moving Picture Experts Group)2 system as a compression-encoding system for image data, and then multiplexes them into one bit stream for transmission. At this time, this digital satellite broadcasting system adds error correcting codes to compressively-coded image data and then transmits it on a transmitting side, and decodes the error correcting codes on a receiving side to correct errors generated in the process of transmission. Thereby, the digital satellite broadcasting system can properly restore a transmission signal on the receiving side even if the carrier-to-noise ratio (C/N ratio) of the transmission signal deteriorates owing-to rainfall or the like, when in transmission.

As shown in FIG. 1, a conventional image data encoding device 1 used in such digital satellite broadcasting system is composed of a source encoding circuit 2, an outer code encoding circuit 3, an interleave circuit 4 and an inner code encoding circuit 5. The image data encoding device 1 inputs input image data S1 supplied from a hard disk or the like to the source encoding circuit 2.

The source encoding circuit 2 performs high efficiency compression coding to the input image data S1 using the MPEG2 system, and feeds thus obtained source coded data S2 to the outer code encoding circuit 3. The outer code encoding circuit 3, as shown in FIG. 2, performs encoding of error correction codes such as reed-solomon (RS) encoding with respect to each of successive payloads having fixed length (k-bytes) forming the source coded data S2 to add a parity bit of fixed length to each payload. Then, the outer code encoding circuit 3 feeds outer code coded data S3 in which the parity bit is added to this payload, formed by successive parity added data of fixed length (n-bytes), to the interleave circuit 4.

Hereinafter, the outer code encoding circuit 3 represents the relationship between the number of bytes of payloads to be inputted and the number of bytes of the parity added data as (n, k). In this case, it is assumed that RS encoding of (n, k) form is executed. In case of the MPEG2 system, the outer code encoding circuit 3 performs RS encoding to each payload of 188 bytes and adding 16 bytes of parity bit thereto respectively. Thus obtained parity added data is outputted in data unit of 204 bytes. In this case, the outer code encoding circuit 3 can be represented that has executed RS encoding in (204, 188) form.

The interleave circuit 4 changes write sequence when the outer code coded data S3 is written into a built-in memory from read sequence when that is read from the above memory and rearranging the data of the outer code coded data S3, and supplies this as interleave data S4 to the inner code encoding circuit 5. Accordingly, in the digital satellite broadcasting system using such image data encoding device 1, even if errors concentrated in during transmission generate, so-called burst errors generate, the burst errors can be distributed by performing deinterleave on the receiving side, thus error correction ability can be reinforced.

The inner code encoding circuit 5 performs convolution encoding to the interleave data S4 and further reinforcing the error correction ability, and feeds this as inner code coded data S5 to the outside. This inner code coded data S5 is converted into a transmission signal by subjected to digital modulation by a modulator which is not shown, provided after the image data encoding device 1, or the like, before transmitted to the receiving side. According to the above, in the digital satellite broadcasting system, since encoding of error correcting codes such as the RS encoding or the convolution encoding or the like is performed to the source coded data S2 before transmission, even if the C/N ratio of the transmission signal deteriorates, error correcting can be performed on decoding side, provided that the errors generated in the above transmission signal is less than a prescribed threshold value. Thereby, the original input image data S1 can be restored.

By the way, in the digital satellite broadcasting system using the image data encoding device 1 having the above configuration, since payload length and parity length are fixed, it has fixed error correction ability. Thus, in such digital satellite broadcasting system, if many errors generate during transmission and the C/N ratio lowers below the prescribed threshold value, a problem such that received transmission signals cannot be properly decoded has been occurred by unfortunately exceeding the error correction ability.

SUMMARY OF THE INVENTION

In view of the foregoing, an object of this invention is to provide a method for adding and encoding error correcting codes and its device and a method for transmitting data having error correcting codes added, capable of improving the reliability of transmitting and receiving with a simple configuration.

The foregoing object and other objects of the invention have been achieved by the provision of a method for adding and encoding error correcting codes and its device and a method for transmitting data having error correcting codes added, in which, in a method for adding and encoding prescribed error correcting codes to input data, an error correcting code of different code length is added to each fixed length of the input data according to the significance of the input data. And the error correcting codes having different error correction ability corresponding to the code length of error correcting code are encoded. Thus, coded data having different packet length according to the code length of error correcting code is generated.

As described above, an error correcting code having different code length is added to a fixed length of input data according to the significance of the input data. The error correcting codes added which have different error correction ability corresponding to its code length are encoded to generate coded data having different packet length according to the code length of the error correcting code. Thus, plural coded data having different error correction ability according to significance can be generated.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 4A to 4C are schematic diagrams showing the state of multiplexing;

DETAILED DESCRIPTION OF THE EMBODIMENT

Preferred embodiments of this invention will be described with reference to the accompanying drawings:

(1) First Embodiment

Figure 3:
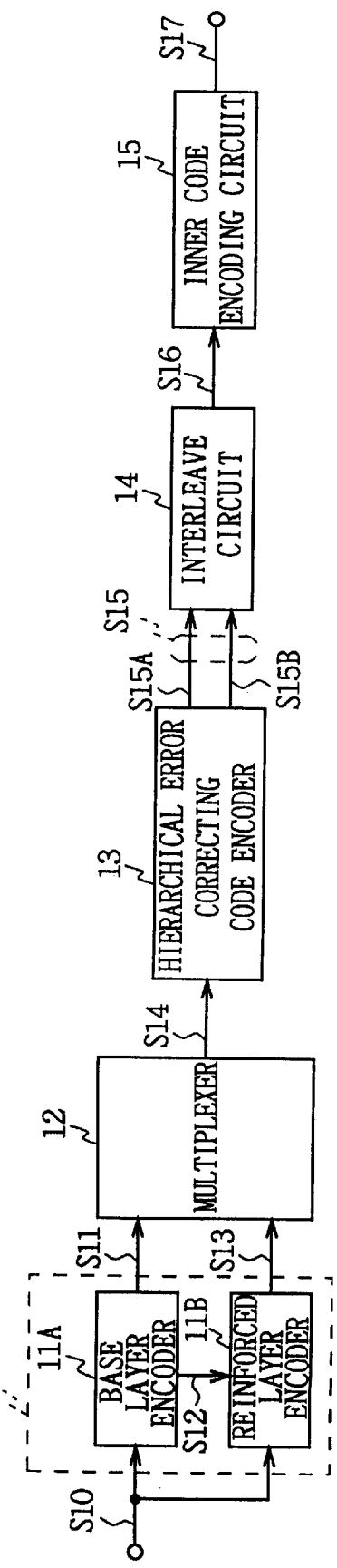
FIG. 3 is a block diagram showing the configuration of an image data encoding device according to a first embodiment of the present invention.

Referring to FIG. 3 generally shows an image data encoding device 10. The device 10 is composed of a hierarchically encoding block 11, a multiplexer 12, a hierarchical error correcting code encoder 13, an interleave circuit 14 and an inner code encoding circuit 15. The image data encoding device 10 inputs HDTV (High Definition Television) image data S10 supplied from a hard disk or the like into the hierarchically-encoding block 11.

The hierarchically-encoding block 11 has a base layer encoder 11A and a reinforced layer encoder 11B. The HDTV image data S10 is supplied to the base layer encoder 11A and the reinforced layer encoder 11B to be divided into two image data having different resolutions for respective encoding (so-called hierarchical encoding).

The base layer encoder 11A thins out desired picture elements from among picture elements of the HDTV image data S10 and generating SDTV (Standard Definition Television) image data. The base layer encoder 11A compressively codes this SDTV image data by the MPEG2 system. Thus obtained base layer coded data S11 is supplied to the multiplexer 12. Furthermore, the base layer encoder 11A performs interpolating filter processing to the SDTV image data and supplying thus obtained SDTV image interpolated data S12 to the reinforced layer encoder 11B.

The reinforced layer encoder 11B obtains difference between the HDTV image data S10 and the SDTV image interpolated data S12 to generate difference data. The reinforced layer encoder 12 compressively encodes this difference data and supplying thus obtained reinforced layer coded data S13 to the multiplexer 12.

Figure 1:
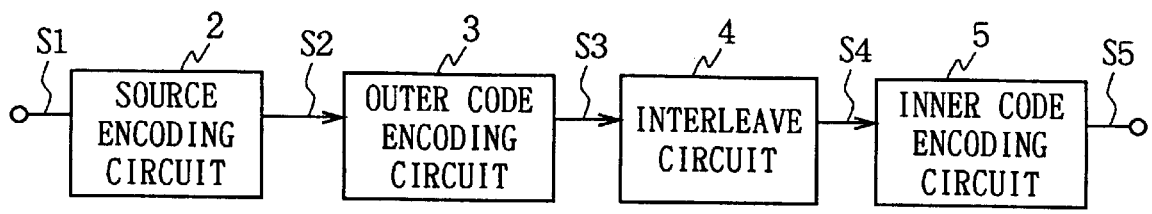
FIG. 1 is a block diagram showing the configuration of a conventional image data encoding device.
Figure 2:
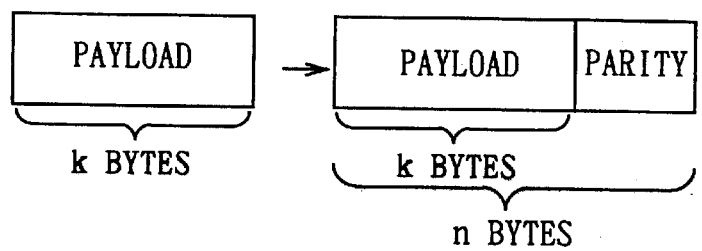
FIG. 2 is a schematic diagram showing the state of adding of error correcting code.

The multiplexer 12 packetizes the base layer coded data S11 (FIG. 4A) by fixed data length L and generating plural base layer code strings corresponding to a payload shown in FIG. 2, as shown in FIGS. 4A to 4C. At the same time, the multiplexer 12 packetizes the reinforced layer coded data S13 (FIG. 4B) by fixed data length L and generating plural reinforced layer code strings corresponding to the aforementioned payload. The multiplexer 12 superimposes a code string identification flag on each of these base layer code string and reinforced layer code string and multiplexes them into one system of stream. Thus obtained multiplexed data S14 (FIG. 4C) is supplied to the hierarchical error correcting code encoder 13.

The hierarchical error correcting code encoder 13 (FIG. 3) adds a parity bit having different data length to each of the base layer code string and the reinforced layer code string forming the multiplexed data S14 for addition of error correcting codes corresponding to the above parity bits. Specifically, the hierarchical error correcting code encoder 13 first detects a partition of code strings forming the multiplexed data S14 based on the code string identification flags superimposed on the base layer code string and the reinforced layer code string, and then identifies whether the above code string is base layer code string or reinforced layer code string. In this case, in the hierarchical error correcting code encoder 13, since base layer code strings and reinforced layer code strings have fixed length, so that it can be more easily identified than the case of variable length.

Then, the hierarchical error correcting code encoder 13 adds a parity bit of 1b bytes to each base layer code string of L bytes to perform RS encoding in (L+1b, L) form of output L+1b bytes to input L bytes. Thus obtained base layer coded data S15A is supplied to the interleave circuit 14 as output data of hierarchically-coded error correcting code S15. At the same time, the hierarchical error correcting code encoder 13 adds a parity bit of 1e bytes which is smaller than 1b byte to each reinforced layer code string of L bytes to perform RS encoding in (L+1e, L) form. Thus obtained reinforced layer coded data S15B is supplied to the interleave circuit 14 as output data of hierarchically coded error correcting code S15.

In this case, in the hierarchical error correcting code encoder 13, a parity bit having a longer parity length than a reinforced code string is added to a base layer code string equal to the reinforced code string in data length. Therefore, base layer parity added data in which parity bits are added to base layer code strings has higher error correction ability than reinforced layer parity added data in which parity bits are added to reinforced layer code strings. The hierarchical error correcting code encoder 13 can adaptively switch error correction ability according to the significance of data as the above.

The interleave circuit 14 identifies about the base layer parity added data forming the base layer coded data S15A and the reinforced layer parity added data forming the reinforced layer coded data S15B. These base layer parity added data and reinforced layer parity added data are sequentially written into different memories respectively. Then, the interleave circuit 14 rearranges the data by making read sequence differ from write sequence at the time of reading-out of data, and supplies this to the inner code encoding circuit 15 as interleave data S16.

Figure 5A:
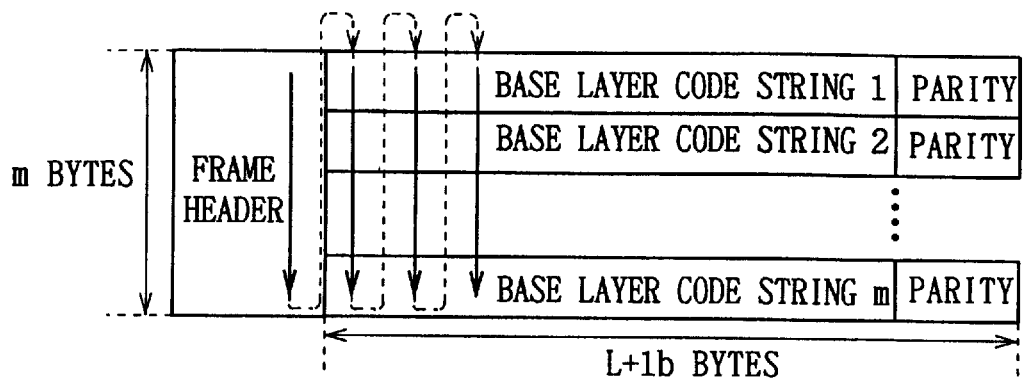
FIGS. 5A and 5B are schematic diagrams showing the state of interleave processing.

That is, as shown in FIG. 5A, the interleave circuit 14 sequentially writes the base layer parity added data one for line in a region from a first line to an m-th line with respect to a rectangular region on the memory formed by L+1b bytes in line direction and (m) bytes in column direction. Then, the interleave circuit 14 adds frame headers to these (m) base layer parity added data written, so that base layer transmission frames are generated.

Figure 5B:
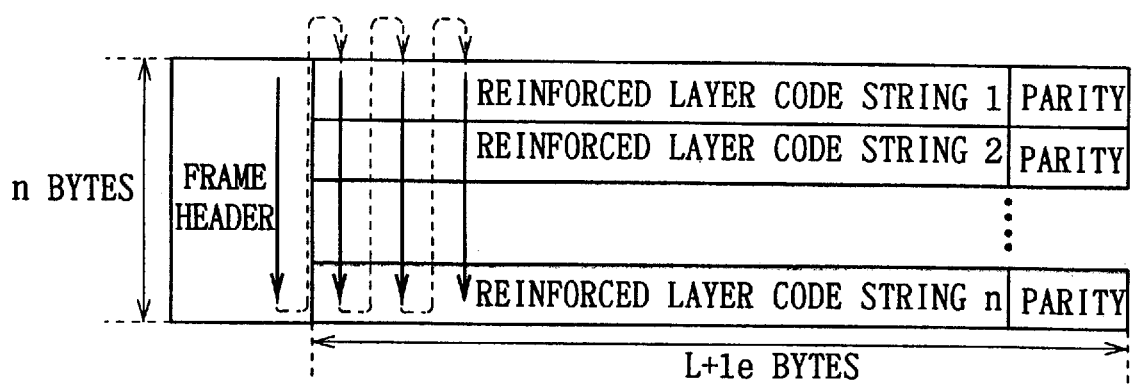

Similarly, as shown in FIG. 5B, the interleave circuit 14 sequentially writes the reinforced layer parity added data to a rectangular region on the memory formed by L+1e bytes in line direction and (n) bytes in column direction. Then, the interleave circuit 14 adds a frame header to each of (n) reinforced layer parity added data thus written to generate reinforced layer transmission frames. A sync bit string showing the head of frame and a frame identification flag for identifying whether the above frame is base layer transmission frame or reinforced layer transmission frame are inserted into these frame headers.

The interleave circuit 14 then reads out the base layer transmission frames and the reinforced layer transmission frames written in two different memories respectively in the order shown by arrows in FIGS. 5A and 5B to rearrange the data respectively, and supplies these as interleave data S16 to the inner code encoding circuit 15. The inner code encoding circuit 15 convolution-codes the interleave data S16 to further reinforce the error correction ability, and supplies thus obtained inner code coded data S17 to the outside. This inner code coded data S17 is subjected to digital modulation or the like by a modulator (not shown) provided after the image data encoding device 10 and converted into a transmission signal, and then it is transmitted to the receiving side.

Figure 6:
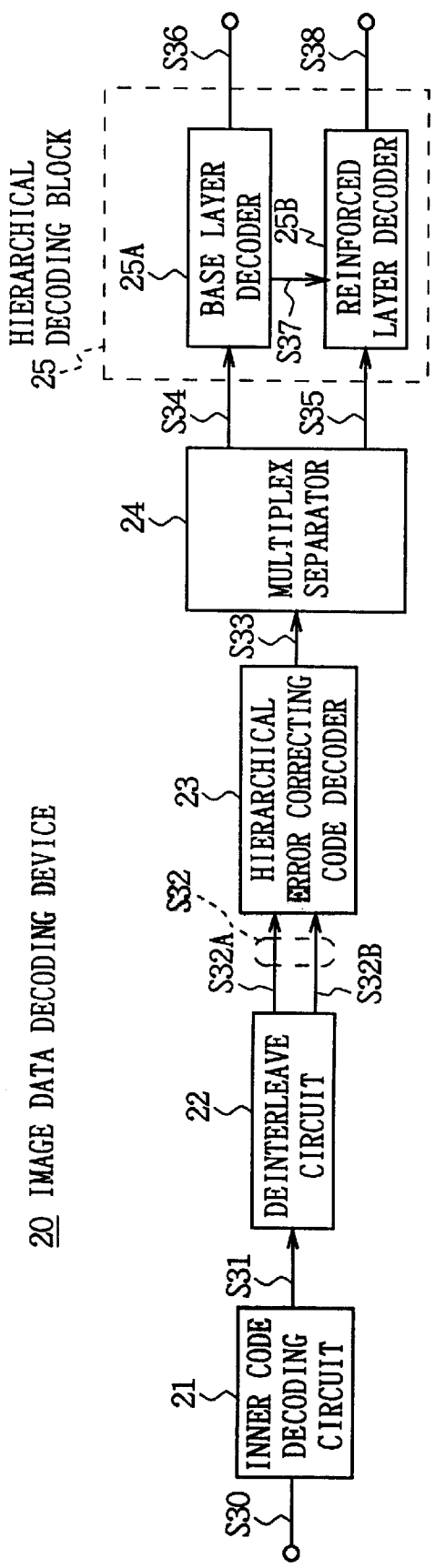
FIG. 6 is a block diagram showing the configuration of an image data decoding device according to the first embodiment.

Thus transmitted transmission signal is demodulated by a demodulator (not shown) on the receiving side, and then the demodulated signal is fed to an image data decoding device 20 provided after the above demodulator, such as shown in FIG. 6. The image data decoding device 20 is composed of an inner decoding circuit 21, a deinterleave circuit 22, a hierarchical error correcting code decoder 23, a multiplex separator 24 and a hierarchically-decoding block 25. The demodulated received data S30 is fed to the inner code decoding circuit 21.

The inner code decoding circuit 21 performs error correcting of the received data S30 by, for example, a viterbi decoding method, and supplies thus obtained inner code decoded data S31 to the deinterleave circuit 22. The deinterleave circuit 22 detects a sync bit string from the frame header inserted in the inner code decoded data S31 to identify the head of the base layer transmission frame and the head of the reinforced layer transmission frame, and sequentially writes these base layer transmission frame and reinforced layer transmission frame to different memories respectively. Then, the deinterleave circuit 22 rearranges the data by reading it out in such order different from the write sequence to return them in the original order. Thus obtained base layer transmission frame S32A and reinforced layer transmission frame S32B are supplied to the hierarchical error correcting code decoder 23.

The hierarchical error correcting decoder 23 decodes the frame identification flags inserted in the frame headers of the base layer transmission frame S32A and the reinforced layer transmission frame S32B to discriminate whether to be the base layer transmission frame S32A or the reinforced layer transmission frame S32B. The hierarchical error correcting code decoder 23 performs the error correcting of the base layer transmission frame S32A and the reinforced layer transmission frame S32B based on this discriminated result and generating error correcting code decoded data S33, and supplies this to the multiplex separator 24.

The multiplex separator 24 separates the error correcting code decoded data S33 to generate base layer coded data S34 and reinforced layer coded data S35. The base layer coded data S34 is supplied to the base layer decoder 25A of the hierarchically-decoding block 25. On the other hand, the reinforced layer coded data S35 is supplied to the reinforced layer decoder 25B of the hierarchically-decoding block 25.

The base layer decoder 25A extensionally decodes the base layer coded data S34 and supplying thus obtained SDTV image data S36 to the outside. In addition, the base layer decoder 25A performs interpolating filter processing to the SDTV image data S36, and supplies thus obtained interpolated SDTV image data S37 to the reinforced layer decoder 25B.

The reinforced layer decoder 25B generates difference data by extensionally decoding the reinforced layer coded data S35. The reinforced layer decoder 25B adds this difference data to the interpolated SDTV image data S37 to restore HDTV image data S38, and supplies it to the outside.

Such digital satellite broadcasting system selects desired one of the SDTV image data S36 and the HDTV image data S38 according to the resolution of a television monitor (not shown) or the like, and displaying on the above television monitor. Accordingly, even in the case where the SDTV image data S36 in which only the base layer coded data S34 is extensionally decoded is selected, this digital satellite broadcasting system can obtain the quality of image as well as the current broadcasting. Besides, in the case where the HDTV image data S38 in which both of the base layer coded data S34 and the reinforced layer coded data S35 are extensionally decoded is selected, the quality of image higher than the current broadcasting can be obtained (hereinafter, this is referred to as space scalability function).

According to the above configuration, each data of the ba.se layer transmission frame and the reinforced layer transmission frame formed in the interleave circuit 14 is supplied to transmission system via the inner code encoding circuit 15 at prescribed timing. That is, each data of the base layer transmission frame and the reinforced layer transmission frame is transmitted in the transmission system.

Accordingly, for example, if C/N at receiving side deteriorates owing to the influence of rainfall or the like, the base layer coded data S15A having high error correction ability is surely decoded at least.

Thus, according to the above configuration, the significant coded data (base layer coded data S15A) can be transmitted while improving its error correction ability. Thereby, decoding on the receiving side can be ensured.

(2) Second Embodiment

Figure 7:
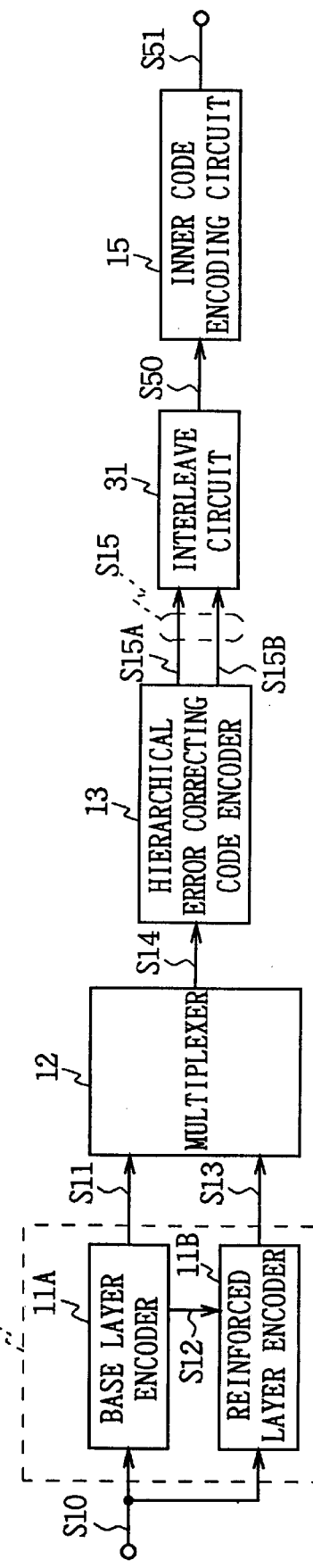
FIG. 7 is a block diagram showing the configuration of an image data encoding device according to a second embodiment.

FIG. 7 in which the same reference number is added to the corresponding part of FIG. 3 shows an image data encoding device 30 according to a second embodiment. This device 30 is configured similarly to the image data encoding device 10 according to the first embodiment except for the configuration of an interleave circuit 31.

The interleave circuit 31 sequentially writes the base layer parity added data forming the base layer coded data S15A and the reinforced layer parity added data forming the reinforced layer coded data S15B into one memory in desired order. When reading data out, the interleave circuit 31 rearranges the data by reading the data out in different order from write sequence, and supplies this to the inner code encoding circuit 15 as interleave data S50.

Figure 8A:
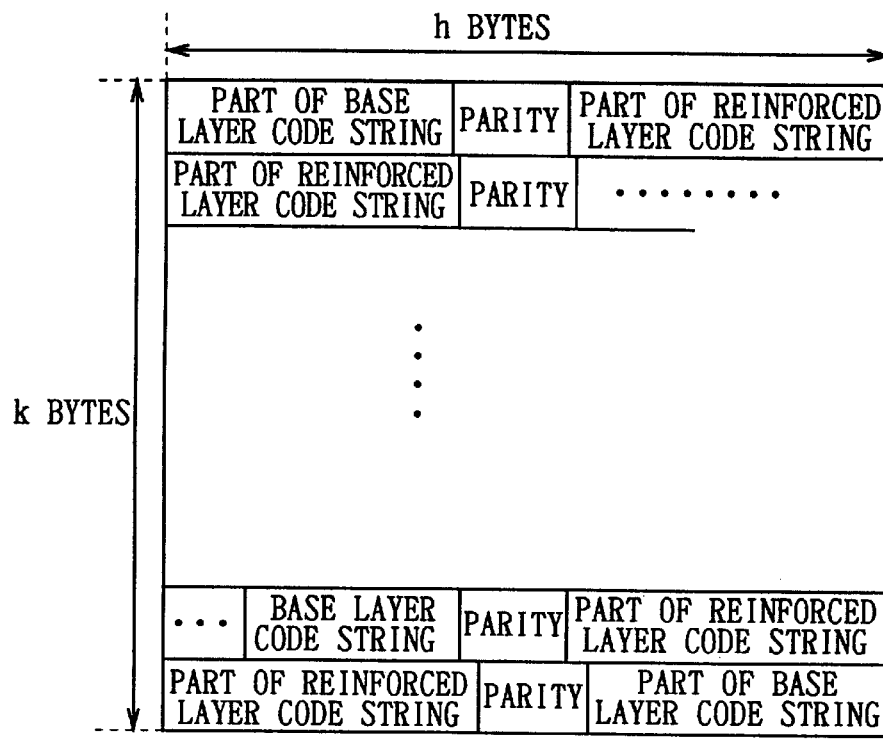
FIGS. 8A and 8B are schematic diagrams showing the state of interleave processing.

That is, as shown in FIG. 8A, the interleave circuit 31 sequentially writes in desired number of the base layer parity added data and the reinforced layer parity added data in desired order from the top of a first line to a rectangular region on a memory formed by (h) bytes in line direction and (k) bytes in column direction. In this case, any inconvenience does not occur even if write to the rectangular region on the memory is started from the middle of the parity-added data or even if write is stopped in the middle of the parity-added data. When write is stopped, the interleave circuit 31 generates transmission frames by adding frame headers to plural base layer parity-added data and reinforced layer parity-added data written-in, as shown in FIG. 8B.

Figure 9:
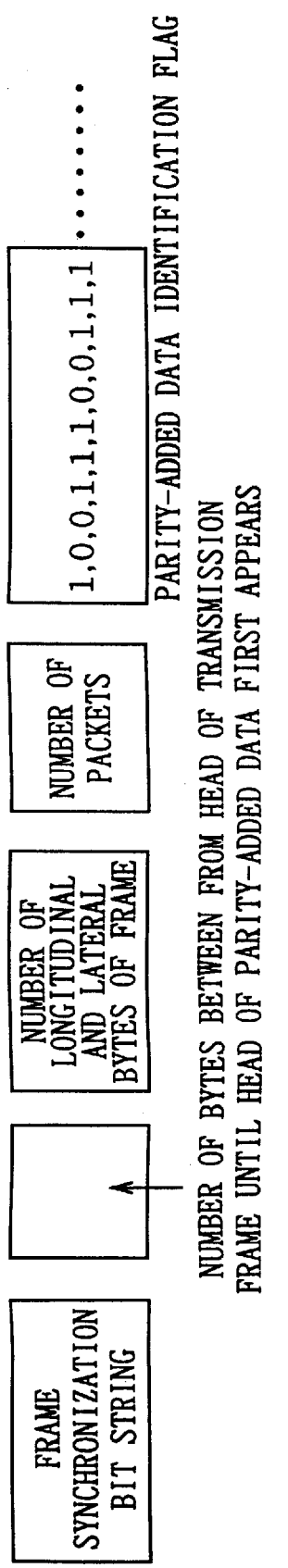
FIG. 9 is a schematic diagram showing a data structure of frame header.

As shown in FIG. 9, a sync bit string showing the head of the transmission frame, the number of bytes from the head of the transmission frame until the head of the parity-added data first appears, and the number of longitudinal and lateral bytes of the transmission frame are sequentially inserted into this frame header. In this frame header, the number of the parity-added data included in the transmission frame is further inserted in the specified width of the number of bits, and parity-added data identification flags for identifying whether each parity-added data forming transmission frame is the base layer parity-added data or the reinforced layer parity added-data from the top in order are inserted by the number of parity-added data.

Since each data forming such frame header is more significant data than a base layer code string or a reinforced layer code string in the transmission frame, it is desired that error correction ability is reinforced more than the case where parity bits are added to these base layer code string and reinforced layer code string.

Figure 8B:
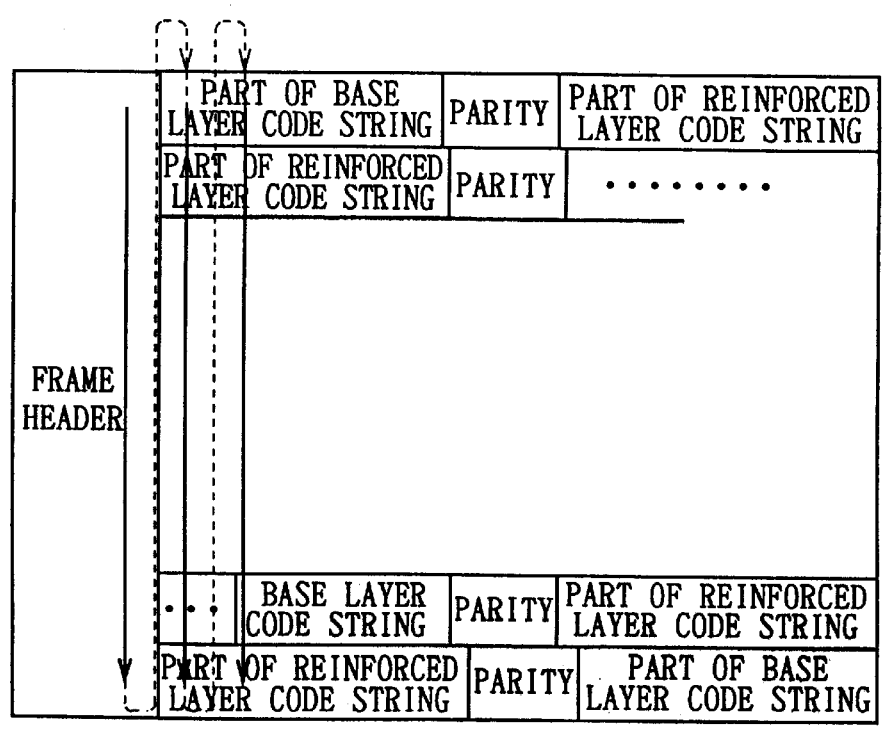

The interleave circuit 31 rearranges data by reading out the transmission frames written in the memory in such order as shown by arrows in FIGS. 8A and 8B, and supplies this to the inner code encoding circuit 15 as interleave data S50. The inner code encoding circuit 15 further reinforces error correction ability by convolution-encoding the interleave data S50, and supplies thus obtained inner code coded data S51 to the outside.

Figure 10:
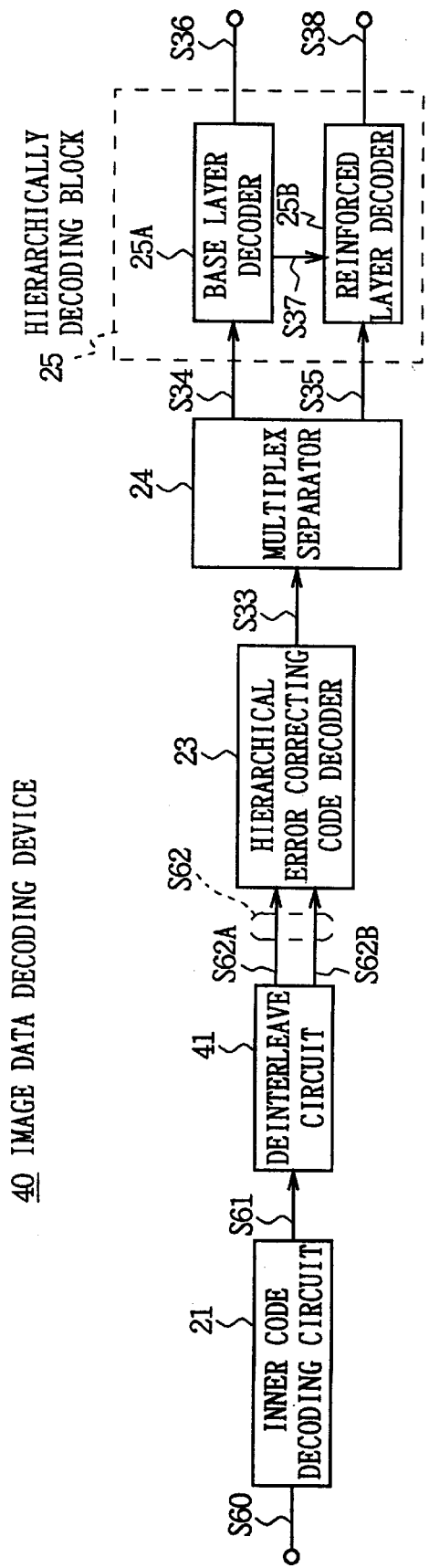
FIG. 10 is a block diagram showing the configuration of an image data decoding device according to the second embodiment.

On the other hand, in the decoding side of the second embodiment, as shown in FIG. 10 in which the same reference numeral is added to the corresponding part of FIG. 6, an image data decoding device 40 is provided. The above image data decoding device 40 has a similar configuration as the image data decoding device 20 according to the first embodiment except for the configuration of a deinterleave circuit 41.

The inner code decoding circuit 21 performs error correction of received data S60 and supplying thus obtained decoded inner code data S61 to the deinterleave circuit 41. The deinterleave circuit 41 identifies the head of transmission frames by detecting a sync bit string in a frame header inserted into the decoded inner code data S61, and writes the above transmission frame in a memory.

If finishing the write-in, the deinterleave circuit 41 reads the frame headers out in different order from write sequence to detect the position of each parity-added data after checking the number of parity-added data forming the transmission frame, and obtains identification information for identifying whether the detected parity-added data is the base layer parity-added data or the reinforced layer parity-added data. Then, the deinterleave circuit 41 reads out the parity-added data of the transmission frame in a different order from the write sequence based on this identification information, so that data is rearranged and restored in the original sequence. Thus obtained base layer transmission frame S62A and reinforced layer transmission frame S62B are supplied to the hierarchical error correcting code decoder 23.

According to the above configuration, each data of the transmission frame formed in the interleave circuit 31 is supplied to the transmission system via the inner code encoding circuit 15 at prescribed timing. That is, each data of the transmission frame is transmitted in the transmission system.

Accordingly, for example, if C/N at receiving side deteriorates owing to the influence of -rainfall or the like, the base layer coded data S15A having high error correction ability is surely decoded at least, in the transmission frame.

Thus, according to the above configuration, the significant coded data (base layer coded data S15A) can be transmitted while improving its error correction ability. Thereby, decoding on the receiving side can be ensured.

In this connection, since data which forms a frame header is formed by the number of bytes until the head of parity-added data first appears, the number of longitudinal and lateral bytes and the number of packets, in addition to the sync bit string and the frame identification flag or the like, transmission frames may be in single format.

By the way, other than the aforementioned method for adding parity bits having longer parity length than parity bits added to reinforced layer code string to the base layer code string, it can be considered that a method for making larger the redundancy of the base layer parity-added data than the redundancy of the reinforced layer parity-added data in the state where the data length of the base layer parity-added data and the reinforced layer parity-added data are fixed.

However, in an image data encoding device using such method, since packet length must be changed when a base layer code string and a reinforced layer code string are transmitted from a multiplexer to a hierarchical error correcting code encoder in packet form, the identification of packets becomes difficult on the hierarchical error correcting code encoder side.

Thus, in such image data encoding device, to make the identification of packets easy, a reserve region being variable length is added to the base layer code string and/or the reinforced layer code string in the multiplexer so that it is transmitted to the hierarchical error correcting code encoder as packets having fixed length, or a signal showing the partition of packets must be generated and transmitted to the hierarchical error correcting code encoder. Thus, the configuration of the multiplexer is complicated.

On the other hand, in the image data encoding devices 10 and 30 according to the first and the second embodiments, since the packet length of the base layer code string and the reinforced layer code string to be supplied from the multiplexer 12 to the hierarchical error correcting encoder 13 are fixed, the configuration of the multiplexer 12 can avoid being complicated.

(3) Other Embodiments

Note that, the above embodiments have dealt with the case of compressively encoding SDTV image data and difference data using the MPEG2 system. The present invention, however, is not only limited to this but also they may be compressively encoded using another compression-encoding system such as an MPEG1 system for example.

The above embodiments have dealt with the case of performing RS encoding to a base layer code string and a reinforced code string. The present invention, however, is not only limited to this but also another encoding of error correcting codes such as a BCH (Bose-Chaudhuri-Hochquenghem) encoding, for example, may be performed.

The above embodiments have dealt with the case of adding and hierarchically encoding error correcting codes to the multiplexed data 14 obtained by multiplexing the base layer coded data S11 and the reinforced layer coded data S13. The present invention, however, is not only limited to this but also such hierarchically encoding of error correcting codes may be performed in which data is separated into data composed of I-pictures subjected to interframe encoding and data composed of B- and P-pictures subjected to intraframe encoding, and error correcting codes having higher error correction ability are added and encoded to the data of I-pictures than the data of I-pictures.

The above embodiments have dealt with the case of hierarchically encoding error correcting codes to the multiplexed data 14 obtained by multiplexing the base layer coded data S11 and the reinforced layer coded data S13. The present invention, however, is not only limited to this but also it may be applied to the combination of image data, audio data and character data or the like. For example, error correcting codes having high error correction ability may be encoded to the sound data and the character data even under the condition that receiving state deteriorates, provided that normal reception is required about the sound data and the character data at the minimum.

The above embodiments have dealt with the case of adding and hierarchically encoding error correcting codes to the multiplexed data 14 obtained by multiplexing the base layer coded data S11 and the reinforced layer coded data S13. The present invention, however, is not only limited to this but also error correction ability may be changed according to the priority of two data. That is, error correcting codes having higher error correction ability may be added and encoded to data having higher priority, while error correcting codes having lower error correction ability may be added and encoded to data having lower priority.

The above embodiments have dealt with the case of adding and hierarchically encoding error correcting codes to the multiplexed data 14 obtained by multiplexing the base layer coded data S11 and the reinforced layer coded data S13. The present invention, however, is not only limited to this but also error correcting codes may be added and encoded to multiplexed data composed of three or more hierarchically-coded data according to two error correction abilities, respectively.

Furthermore, the above embodiments have dealt with the case of adding and hierarchically-encoding error correcting codes by separating the HDTV image data S10 into two hierarchies. The present invention, however, is not only limited to this but also error correcting codes may be added and hierarchy-encoded by separating it into three or more hierarchies.

According to the present invention as described above, an error correcting code having different code length is added to a fixed length of input data according to the significance of the input data. The error correcting codes added which have different error correction ability corresponding to its code length are encoded to generate coded data having different packet length according to the code length of the error correcting code. Thus, plural coded data having different error correction ability according to significance can be generated.

Thus, even if the quality of transmission system deteriorates when the above coded data is transmitted, coded data having high error correction ability can be surely decoded.

While there has been described in connection with the preferred embodiments of the invention, it will be obvious to those skilled in the art that various changes and modifications can be aimed, therefore, to cover in the appended claims all such changes and modifications as fall within the true spirit and scope of the invention.

What is claimed is:

1. A method for encoding a prescribed error correcting code with input data, comprising:
   receiving said input data;
   generating said error correcting code for every fixed length of said input data, said error correcting code having a longer code length when a given fixed length of said input data has a greater significance than another fixed length of said input data; and
   adding said error correcting code to said input data to generate a packet having a packet length according to said significance of said input data.

2. The method according to claim 1, further comprising adding a header to said packet, said header comprising a sync bit string representing a head of a frame and an identifier representing a type of said error correcting code.

3. The method according to claim 1, wherein said input data is hierarchically encoded data.

4. The method according to claim 1, further comprising performing interleave processing for prescribed block units in which a prescribed number of said packets are collected.

5. The method according to claim 1, further comprising performing interleave processing for prescribed block units in which a prescribed number of said packets are collected by a type of said error correcting code.

6. An encoding device for encoding a prescribed error correcting code with input data, comprising:
   input means for inputting said input data;
   generating means for generating said error correcting code for each fixed length of said input data, said error correcting code having a longer code length when given fixed length of said input data has a greater significance; and
   adding means for adding said error correcting code to said input data to generate a packet having differing packet length according to the significance of said input data.

7. The encoding device according to claim 6, further comprising adding means for adding a header to said packet, said header comprising a sync bit string representing a head of a frame and an identifier representing a type of said error correcting code.

8. The encoding device according to claim 6, wherein said input data is hierarchically encoded data.

9. The encoding device according to claim 6, further comprising means for performing interleave processing for prescribed block units in which a prescribed number of said packets are collected.

10. The encoding device according to claim 6, further comprising means for performing interleave processing for prescribed block units in which a prescribed number of said packets are collected by a type of said error correcting code.

11. A method for encoding input data, comprising:
    separating said input data into a base layer data stream and a reinforced layer data stream, said base layer data stream containing data of greater significance than said reinforced layer data stream;
    packetizing said base layer data stream and said reinforced layer data stream into a stream of base layer packets and reinforced layer packets;
    adding an error correcting code of a first length to each base layer packet; and
    adding an error correcting code of a second length to each reinforced layer packet.

12. The method according to claim 11, wherein said first length is greater than said second length.

13. The method according to claim 11, further comprising producing respective frames of said base layer packets and frames of said reinforced layer packets, and adding respective headers to said frames, each header including a sync bit string identifying a head of a given one of said frames and a frame ID flag identifying whether a given one of said frames contains said base layer packets or said reinforced layer packets.

14. The method according to claim 11, wherein said input data is high definition television (HDTV) data, said method further comprising: (i) converting said HDTV data into standard definition television (SDTV) data for use in said base layer data stream; (ii) interpolating said SDTV data to produce interpolated SDTV data; and (iii) taking a difference between said HDTV data and said interpolated SDTV data for use in said reinforced layer data stream.

15. The method according to claim 14, further comprising compressing said SDTV data to produce said base layer data stream; and compressing said difference between said HDTV data and said interpolated SDTV data to produce said reinforced layer data stream.

16. The method according to claim 15, wherein said compressing steps employ at least one technique selected from the group consisting of MPEG2 and MPEG1.

17. The method according to claim 11, wherein said error correcting codes are selected from the group consisting of Reed-Solomon codes and Bose-Chaudhuri-Hochquenghem codes.

18. The method according to claim 11, wherein said input data is high definition television (HDTV) data, said method further comprising converting said HDTV data into I-picture data for use in said base layer data stream, and into at least one of B-picture data and P-picture data for use in said reinforced layer data stream.

19. An encoder for encoding input data, comprising:
a hierarchical encoding unit operable to separate said input data into a base layer data stream and a reinforced layer data stream, said base layer data stream containing data of greater significance than said reinforced layer data stream;
a multiplexer operable to packetize said base layer data stream and said reinforced layer data stream into a stream of base layer packets and reinforced layer packets; and
a hierarchical error correcting encoder operable to add an error correcting code of a first length to each base layer packet, and to add an error correcting code of a second length to each reinforced layer packet.

20. The encoder according to claim 19, wherein said first length is greater than said second length.

21. The encoder according to claim 19, further comprising an interleave circuit operable to produce respective frames of said base layer packets and frames of said reinforced layer packets, and to add respective headers to said frames, each header including a sync bit string identifying a head of a given one of said frames and a frame ID flag identifying whether a given one of said frames contains said base layer packets or said reinforced layer packets.

22. The encoder according to claim 19, wherein said input data is high definition television (HDTV) data, and said hierarchical encoding unit is further operable to: (i) convert said HDTV data into standard definition television (SDTV) data for use in said base layer data stream; (ii) interpolate said SDTV data to produce interpolated SDTV data; and (iii) take a difference between said HDTV data and said interpolated SDTV data for use in said reinforced layer data stream.

23. The encoder according to claim 22, wherein said hierarchical encoding unit is further operable to compress said SDTV data to produce said base layer data stream, and to compress said difference between said HDTV data and said interpolated SDTV data to produce said reinforced layer data stream.

24. The encoder according to claim 23, wherein said hierarchical encoding unit employs one of MPEG2 and MPEG1 to accomplish said compression.

25. The encoder according to claim 19, wherein said error correcting codes are taken from the group consisting of Reed-Solomon codes and Bose-Chaudhuri-Hochquenghem codes.

26. The encoder according to claim 19, wherein said input data is high definition television (HDTV) data, and said hierarchical encoding unit is further operable to convert said HDTV data into I-picture data for use in said base layer data stream, and into at least one of B-picture data and P-picture data for use in said reinforced layer data stream.

\* \* \* \* \*